(12) United States Patent
Chen et al.

(10) Patent No.: US 8,566,400 B2
(45) Date of Patent: Oct. 22, 2013

(54) ON DEMAND EMAIL RESPONSE

(75) Inventors: Yen-Fu Chen, Austin, TX (US); John Hans Handy-Bosma, Cedar Park, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2889 days.

(21) Appl. No.: 10/955,199

(22) Filed: Sep. 30, 2004

(65) Prior Publication Data

US 2006/0075043 A1  Apr. 6, 2006

(51) Int. Cl.
*G06F 15/16* (2006.01)

(52) U.S. Cl.
USPC .......................................................... 709/206

(58) Field of Classification Search
USPC .......................................... 713/193; 709/206
See application file for complete search history.

(56) References Cited

U.S. PATENT DOCUMENTS

| | | | |
|---|---|---|---|
| 5,694,616 A | 12/1997 | Johnson et al. | 395/860 |
| 6,732,273 B1 * | 5/2004 | Byers | 713/193 |
| 6,944,662 B2 * | 9/2005 | Devine et al. | 709/225 |
| 2002/0059076 A1 * | 5/2002 | Grainger et al. | 705/1 |
| 2002/0120701 A1 | 8/2002 | Ohba | 709/206 |
| 2002/0120702 A1 | 8/2002 | Schiavone et al. | 709/207 |
| 2002/0159575 A1 * | 10/2002 | Skladman et al. | 379/93.24 |
| 2002/0184344 A1 * | 12/2002 | Elvanoglu et al. | 709/219 |
| 2003/0105826 A1 * | 6/2003 | Mayraz | 709/206 |
| 2004/0243677 A1 * | 12/2004 | Curbow et al. | 709/206 |

* cited by examiner

*Primary Examiner* — Jerry Dennison
(74) *Attorney, Agent, or Firm* — Yee & Associates, P.C.; Arthur J. Samodovitz

(57) ABSTRACT

An improvement to an electronic mail program is disclosed. In particular, the improved electronic mail program enables a user to mark individual action items within a message and set attributes for each action item. In the preferred embodiment, attributes include priority, deadline, abstract, and responsibility. The electronic mail program stores the action items and associated attributes in a database and sends the message to one or more recipients. The electronic mail program then displays the message and action items to the recipients. Message recipients then navigate through the list of action items to read descriptions and to determine the priority and nature of the actions necessary. The responsibility attribute further indicates which recipient should respond to the action item. The improved electronic mail program updates the status of each action item in the database as recipients respond.

8 Claims, 2 Drawing Sheets

ON DEMAND EMAIL RESPONSE

FIELD OF THE INVENTION

The invention described below generally relates to a data processing system and method for transferring data between a plurality of computers. In particular, the invention described below comprises subject matter related to priority processing of user data in response to a demand to transfer data between computers.

BACKGROUND OF THE INVENTION

Currently, email clients such as MICROSOFT OUTLOOK and LOTUS NOTES enable a user to exchange electronic messages with other users through networked email servers. These email clients typically display to a user a list of messages that the user has received. If the user wants to view the full message, the user selects the message from the displayed list and the email client renders the selected message on the display device.

Many common email clients also enable a message author to mark the message with a priority attribute, such as "urgent," before sending the message. Generally, these email clients also enable a message recipient to sort or group messages by attributes, including the priority attribute. U.S. Pat. No. 5,694,616 (issued Dec. 2, 1997), for instance, describes a system for sorting messages by comparison—if a new message does not contain a priority listing it will be displayed below any older messages that have been marked as "urgent" or the like. U.S. Patent Application No. U.S. 2002/0120702 A1 (published Aug. 29, 2002), in contrast, describes a bidding process that determines the priority of messages. When sending a message, a user specifies the initial priority bid and a maximum priority bid. These bids represent some type of material value such as cash. Upon delivery, the recipient's email client displays the contents of the inbox in accordance with the current priority bid amount. When a new message has a higher initial bid than another message's current bid, the older message's amount is increased to a higher level than the new message. The new message also can raise its bid level in an attempt to become the highest priority of the sender. The data processing system automatically performs these calculations and allows senders to bid on their message's priority listing.

As described above, current systems allow a message author to send the message with a certain level of priority. The novelty of simply marking a message as "urgent," however, has worn off as more and more users classify their messages as one of the highest priority. A major problem with this new over-prioritization occurs when a sender has a number of related questions or tasks, in which some have a higher priority than others.

Of course, the author manually could split the questions or tasks into separate messages according to priority. This technique, though, increases the author's preparation time and, potentially, overwhelms the recipient with incoming messages. Alternatively, the author could prepare a single message with detailed instructions to the recipient that indicate each item's priority and deadline. Again, though, this technique increases the author's preparation time, as well as the potential for mistake, ambiguity, or confusion within the instructions themselves. Such messages also are likely to be much longer than the original message, which might discourage the recipient from reading the entire message. In the worst case scenario, the recipient might begin responding without ever reading the instructions.

Clearly, existing techniques have significant drawbacks, and there is a need in the art for a more effective means of prioritizing and processing specific items within an email message. The invention described in detail below addresses this need. This and other objects of the invention will be apparent to those skilled in the art from the following detailed description of a preferred embodiment of the invention.

SUMMARY OF THE INVENTION

The invention described below is a useful improvement to an electronic mail program. In particular, the improved electronic mail program enables a user to mark individual action items within a message and set attributes for each action item. In the preferred embodiment, attributes include priority, deadline, abstract, and responsibility. The electronic mail program stores the action items and associated attributes in a database and sends the message to one or more recipients. The electronic mail program then displays the message and action items to the recipients. Message recipients then navigate through the list of action items to read descriptions and to determine the priority and nature of the actions necessary. The responsibility attribute further indicates which recipient should respond to the action item. The improved electronic mail program updates the status of each action item in the database as recipients respond.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "electronic mail program."

Figure 1:
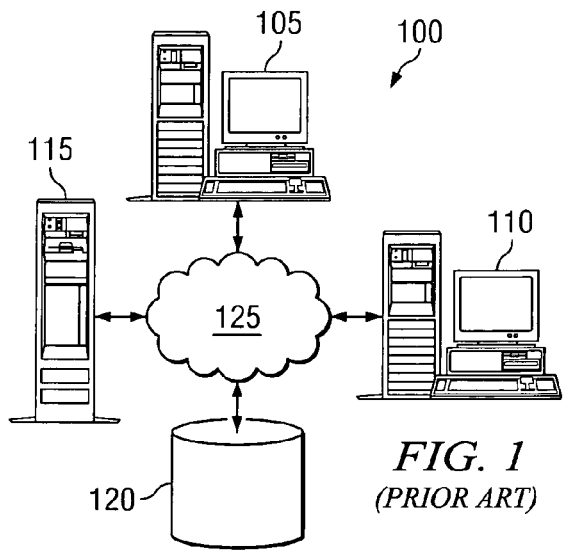
FIG. 1 illustrates an exemplary network of hardware devices.

Additionally, the electronic mail program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
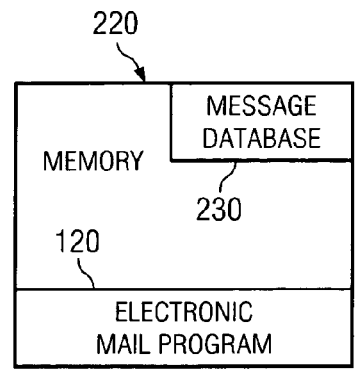
FIG. 2 represents a memory having the components of the improved electronic mail program.

Electronic mail program 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to electronic mail program 200, memory 220 may include message database 230, with which electronic mail program 200 interacts. A person of skill in the art will appreciate that a database, such as message database 230, may exist in many forms. As used herein, the term "database" means any collection of data stored together and organized for rapid search and retrieval, including without limitation flat file databases, fielded databases, full-text databases, object-oriented databases, and relational databases.

Figure 3A:
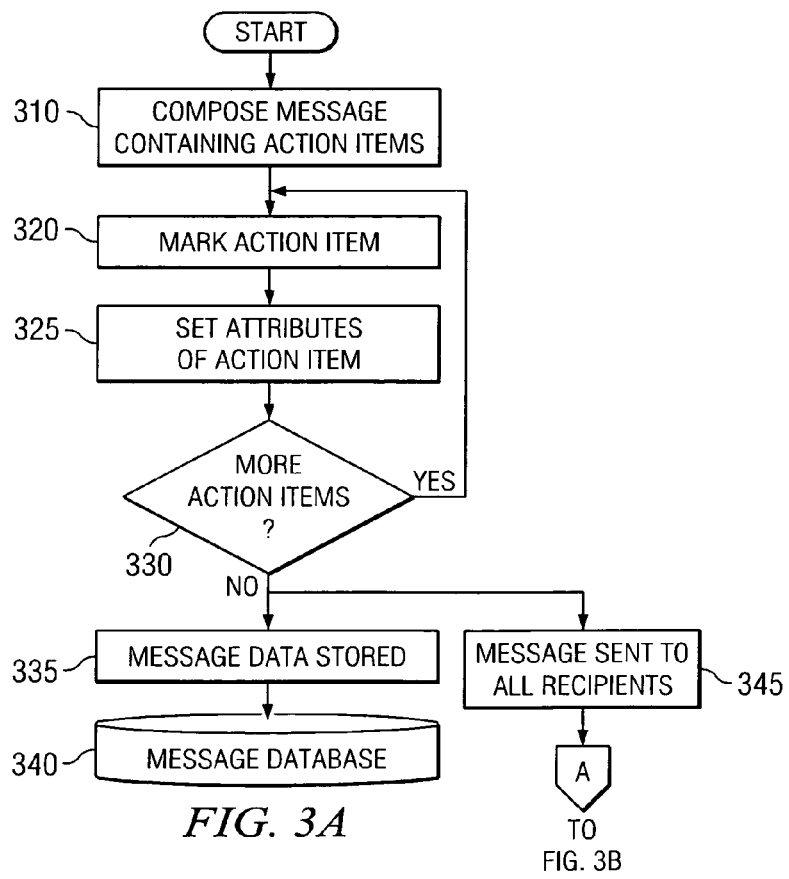
FIG. 3A depicts the interaction of the improved email system with a message sender.

FIG. 3A depicts the interaction of a sender with electronic mail program 200. First, the sender composes an electronic mail message that includes one or more action items (e.g. questions or tasks) (310). The message generally includes basic information regarding the purpose of the communication, in addition to data common to all email messages, such as the date and time, the sender's name, the subject of the message, and the list of recipients. In the preferred embodiment, the sender marks each action item (320), using a mouse, keyboard, or similar input device.

The sender then sets each action item's attributes (325). These attributes allow the sender to create a list that gives recipients the ability to quickly glean the important portions of the message without wasting time wading through detailed paragraphs with extensive background. Attributes include priority, deadline, abstract, and responsibility. Unlike priority attributes associated with conventional email clients, though, the sender can use a priority attribute with electronic mail program 200 to mark each separate action item within a single message with varying levels of urgency. Thus, a sender can include both urgent and regular questions in a single message while avoiding the confusion inherent in other priority solutions that only allow priority to be set for a message as a whole. The deadline attribute gives the recipient a date and time for responding to the action item, i.e. providing an answer or completing a task. Many conventional email client programs also include a calendar, to which, in one embodiment of electronic mail program 200, the sender can import the deadline attributes. With the deadline, alarms may be set for notification if responses are still pending. The sender also may include an abstract attribute with each particular action item. If an item requires a detailed description in order to present a question, a general abstract can be included to provide either an overview of the question or subject-matter. Optionally, electronic mail program 200 could set the abstract attribute automatically by inserting the first sentence of the item, if the sender does not specify the abstract attribute. Finally, an attribute for responsibility allows a sender to send several action items to multiple recipients, while assigning individual items to particular recipients. If the message contains additional action items (330), then the sender repeats this process until all action items have been marked and the attributes of each action item set. Electronic mail program 200 then stores the message data, which includes the action items and associated attributes, in database 340 (335), and sends the message data to the recipients (340).

Figure 3B:
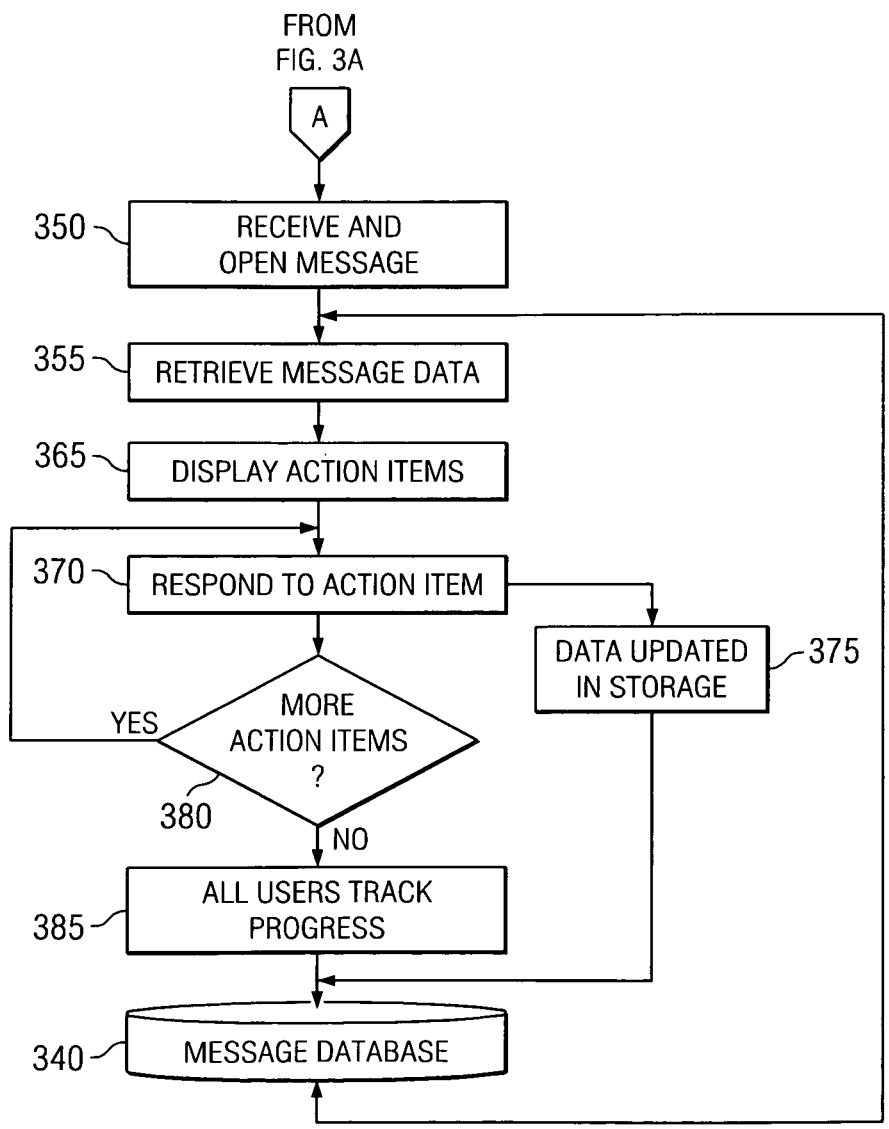
FIG. 3B depicts the interaction of the improved email system with a message recipient.

FIG. 3B depicts the interaction between a message recipient and electronic mail program 200, wherein the message includes a list of action items prepared in accordance with the above process. After receiving the message, the recipient opens the message (350). In the preferred embodiment, electronic mail program 200 receives the action items as either a link to the message data in database 340, or as an attachment having the same message data. Electronic mail program 200 retrieves the action items and attributes (355) from database 340, and then displays the action items and attributes in a new window (365). In an alternative embodiment, electronic mail program 200 displays the action items in the original message window, but then displays the attributes in a "pop-up" window as the recipient moves a cursor over each action item. The recipient also can import deadlines into a calendar and set alarms, so that the calendar system reminds the recipient of approaching deadlines. After viewing an action item, a recipient responds to the action item (370). A response may include an answer to a question, an initial assessment, or an indication that more time will be needed to provide an answer. The recipient can respond to individual action items through a button or link included with each item. Thus, a recipient can respond to higher priority items quickly, without immediately responding to low-priority items. Electronic mail program 200 updates the message data in database 340 as the recipient responds to an action item (375). If the recipient needs to respond to additional action items (380), the recipient repeats the process. Electronic mail program 200 then displays the status of responses to the sender and other recipients (385).

Electronic mail program 200, in conjunction with database 340 clearly offers users significant advantages over conventional electronic mail programs. In particular, they enable a sender to present all action items, especially questions, in a list so a recipient easily can view the questions, separate from any other information or context that the sender provides. Perhaps most significant, though, is that electronic mail program 200 allows both the sender and recipient to maintain a master list of all action items that is sortable by deadline, priority, recipient, status, or any other attribute. Electronic mail program 200 also enables all correspondents to "drill down" through the history of messages, and to view the thread of individual action items, responses, further action items, and clarifications. This feature eliminates the need to sort through the surrounding questions and information. Conventional electronic mail programs only drill down from message to message, where the thread is composed of messages in their entirety, rather than individual action items.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A demand-based messaging system for assigning and updating a plurality of action items, comprising:
    a first computer;
    a first input device, and a first output device, coupled to the first computer;
    a storage device coupled to the first computer;
    a second computer coupled to the first computer through a communications medium;
    a database coupled to the first computer, and to the second computer, through the communications medium;
    a second input device, and a second output device, coupled to the second computer;
    a first demand-based messaging program operable on the first computer, the demand-based messaging program comprising instructions for causing the first computer to perform a first plurality of steps comprising:
        displaying a first user interface on the first output device;
        reading a message data, composed by a sender, from the first input device, the message data comprising a plurality of action items;
        displaying the message data to the sender in the first user interface;
        reading an attribute for each of the plurality of action items from the first input device;
        assigning each attribute to the corresponding action item;
        storing the message data in the database;
        transferring the message data to a plurality of recipients over the communications medium to the second computer; and
    a second demand-based messaging program operable on the second computer, the second demand-based messaging program comprising instructions for causing the second computer to perform a second plurality of steps comprising:
        linking the database to the second computer:
        displaying the message data, to a first recipient, on the second output device;
        receiving a response from the first recipient, from the second input device, wherein the response includes a status indication;
        updating the message data, and the database, with the response; and
        displaying the updated message data to the plurality of recipients;
    wherein a single message may be used to assign action items, assign attributes, and update responses, to a plurality of action items for a plurality of recipients.

2. The demand based messaging system of claim 1 wherein the attribute is selected from the group consisting of: a priority attribute, a deadline attribute, an abstract attribute, and a responsibility attribute.

3. The demand-based messaging system of claim 2 wherein the second demand-based messaging program further comprises instructions for causing the second computer to:
    insert the deadline attribute into a calendar of the first message recipient using the second computer.

4. The demand-based messaging system of claim 2 wherein the first demand-based messaging program further comprises instructions for causing the first computer to perform steps comprising:
    replacing each action item in the message data with a link to the action item in the database; and wherein
    the second demand-based messaging program further comprises instructions for causing the second computer to display the link, to the plurality of recipients.

5. The demand-based messaging system of claim 1 wherein the second demand-based messaging program further comprises instructions for causing the second computer to:
    reading a response to each action item from the second input device; and
    inserting a response status indicator into each action item.

6. A computer implemented process for assigning and tracking a plurality of action items for a plurality of recipients in a single message comprising:
    composing a message to the plurality of recipients, the message containing a plurality of action items;
    marking one or more of the plurality of action items in the message to create a marked action item, and assigning an attribute to each marked action item;
    storing each marked action item, and each attribute corresponding to each marked action item, in a database, and establishing a link between the database and the message;
    sending the message, and the link, to the plurality of recipients over a network;
    displaying each marked action item, and each corresponding attribute, to each of the plurality of recipients;
    responsive to a recipient composing a response, and assigning a response status indicator, to an action item, using the link between the database and the message, updating the database with the response, and with the response status indicator; and
    displaying the action item, the response, and the response status indicator, to the sender, and to each of the recipients;
    wherein a sender may assign a plurality of action items and a plurality of attributes, to a plurality of recipients, in a single message, and track the responses of each recipient to the action items.

7. A computer implemented process of claim 6 wherein the attribute is selected from the group consisting of: a priority attribute, a deadline attribute, an abstract attribute, and a responsibility attribute.

8. The computer implemented process of claim 7 further comprising:
    associating the action item with a second link, and storing the second link in the database; and
    replacing the action item with the second link, and displaying the second link to each of the plurality of recipients; wherein, by clicking on the second link, a recipient may view, or respond, to the action item.

* * * * *